United States Patent
Bashaboina et al.

(10) Patent No.: US 9,218,446 B1
(45) Date of Patent: Dec. 22, 2015

(54) OPTIMIZATION OF INTEGRATED CIRCUITS FOR A RETICLE TRANSMISSION PROCESS WINDOW USING MULTIPLE FILL CELLS

(71) Applicant: GLOBALFOUNDRIES Inc., Grand Cayman (KY)

(72) Inventors: Pavan Bashaboina, San Jose, CA (US); Osamu S. Nakagawa, Redwood City, CA (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 14/303,764

(22) Filed: Jun. 13, 2014

(51) Int. Cl.
*G06F 17/50* (2006.01)

(52) U.S. Cl.
CPC .................... *G06F 17/5072* (2013.01)

(58) Field of Classification Search
CPC ........ G03F 1/50; G03F 17/50; G03F 17/5081
USPC ...................................... 716/50, 54
See application file for complete search history.

(56) References Cited

U.S. PATENT DOCUMENTS

| | | | |
|---|---|---|---|
| 6,620,561 B2 | 9/2003 | Winder et al. | |
| 6,791,666 B2 * | 9/2004 | Yu et al. | 355/55 |
| 7,133,548 B2 * | 11/2006 | Kenan et al. | 382/144 |
| 7,297,453 B2 * | 11/2007 | Watson et al. | 430/30 |
| 7,300,729 B2 * | 11/2007 | Watson et al. | 430/30 |
| 7,511,799 B2 * | 3/2009 | Tel et al. | 355/71 |
| 7,564,545 B2 * | 7/2009 | Stokowski | 356/237.5 |
| 7,689,966 B2 | 3/2010 | Verma et al. | |
| 8,551,677 B2 * | 10/2013 | Hotzel | 430/30 |
| 8,570,485 B2 * | 10/2013 | Ye et al. | 355/30 |
| 8,574,795 B2 * | 11/2013 | Hotzel | 430/30 |
| 8,582,078 B2 * | 11/2013 | Brunner et al. | 355/30 |
| 2013/0212543 A1 * | 8/2013 | Crouse et al. | 716/52 |

\* cited by examiner

*Primary Examiner* — Sun Lin
(74) *Attorney, Agent, or Firm* — Williams Morgan, P.C.

(57) ABSTRACT

Embodiments of the present invention include systems and methods of controlling reticle transmission. A process window for reticle transmission is received. For a given design, default fill cells of a default fill pattern are inserted in unused areas of an integrated circuit (IC). A pattern density is computed for each tile of an IC at each appropriate level, such as metallization levels and contact levels. An IC reticle transmission (RT) is computed for an area corresponding to an entire (or area of) IC or reticle. If the integrated circuit RT is outside of the process window, then the tiles that have an individual tile RT that is outside of the process window are identified and ranked into groups. Default fill cells in one group of tiles are replaced with replacement fill cells having an appropriate pattern and pattern density, and an updated IC RT parameter is computed until the updated IC RT parameter is within the process window.

20 Claims, 13 Drawing Sheets

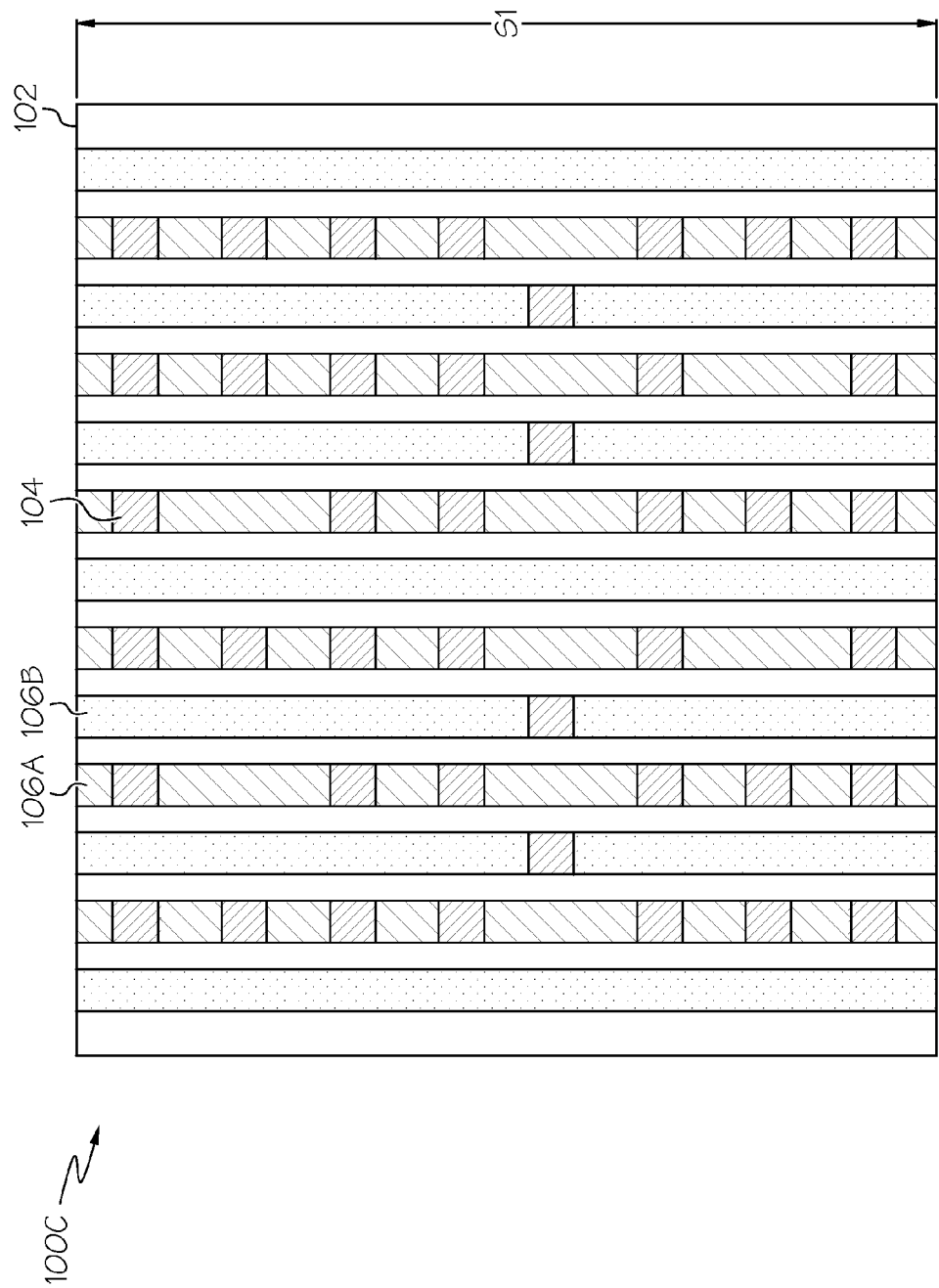

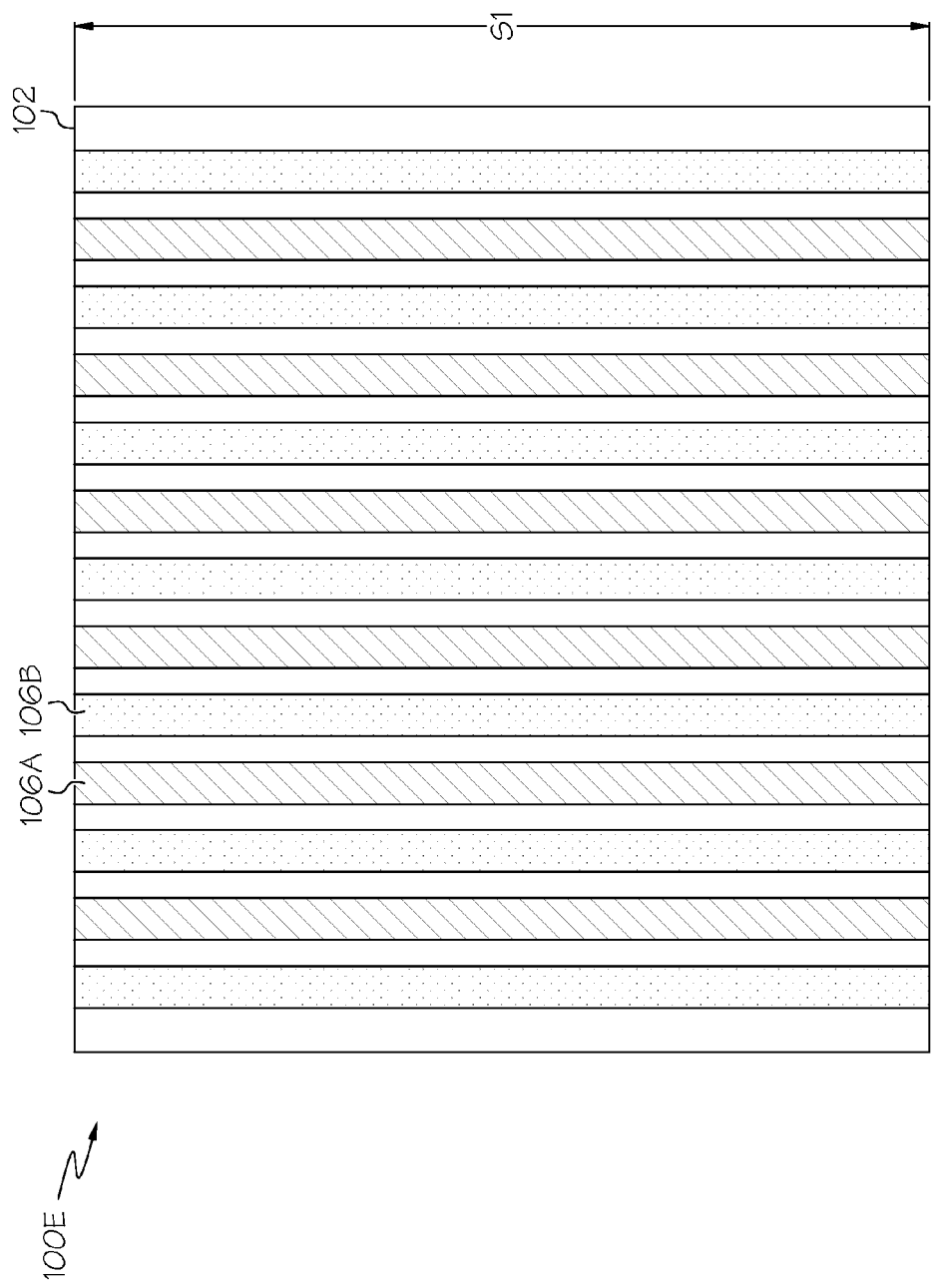

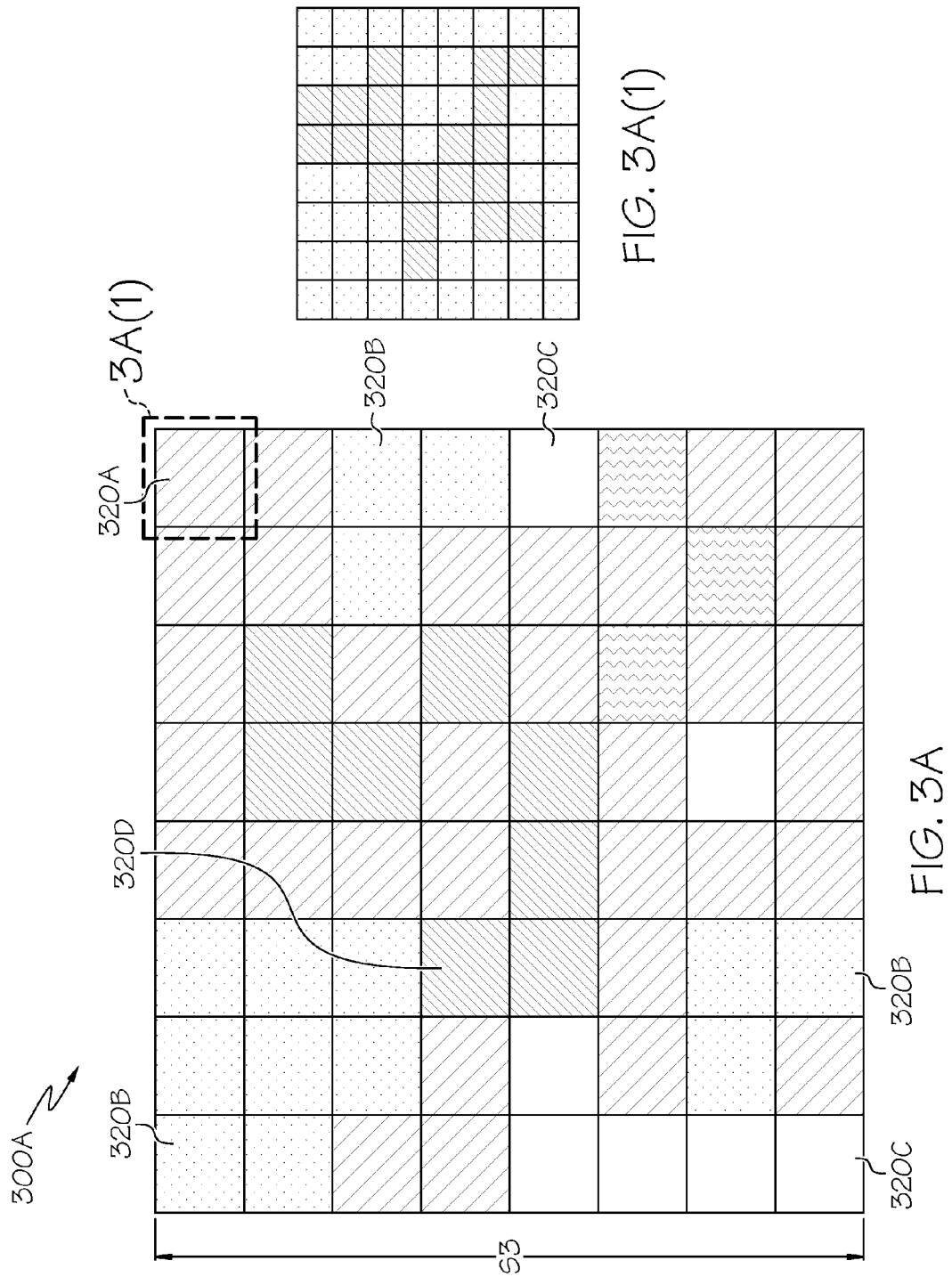

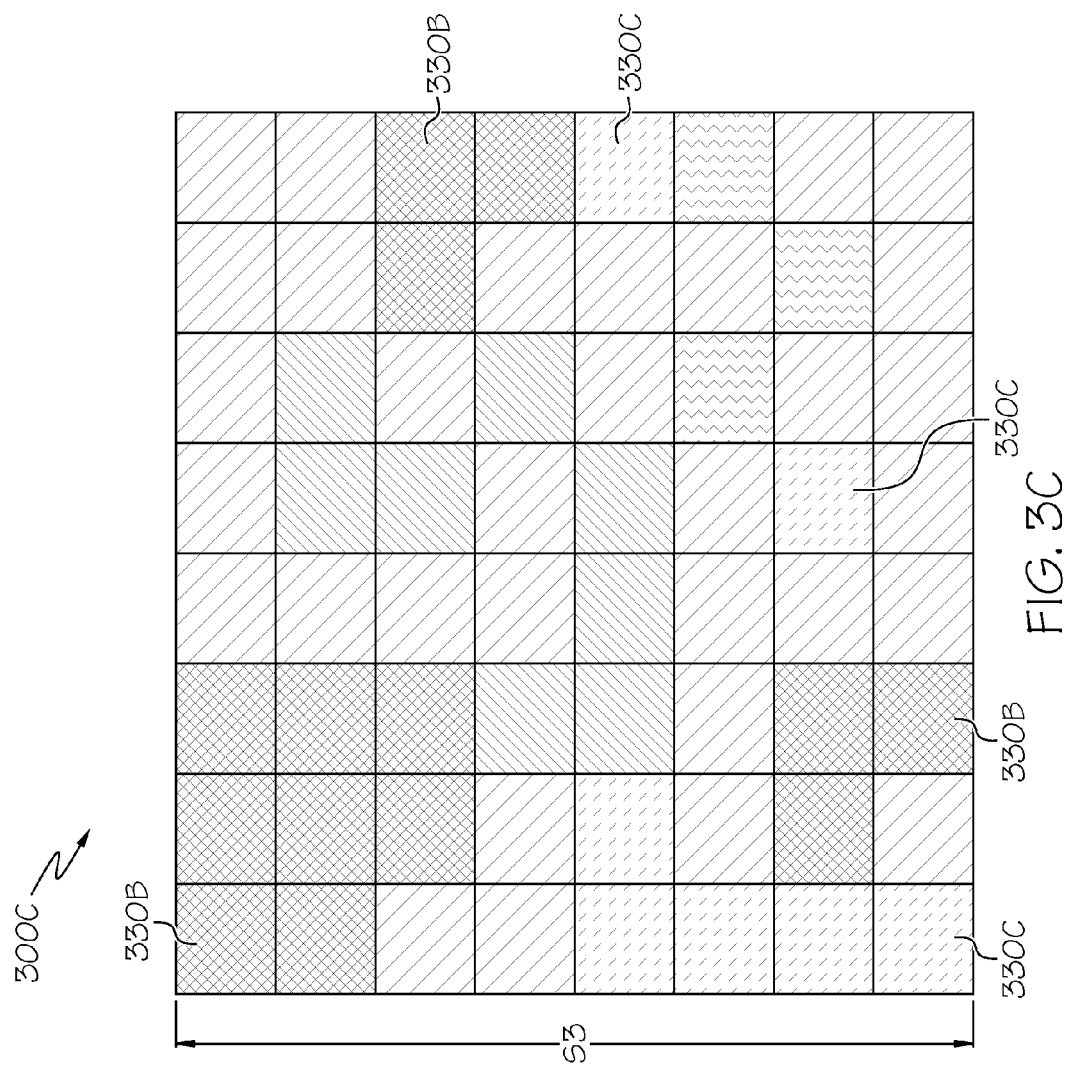

OPTIMIZATION OF INTEGRATED CIRCUITS FOR A RETICLE TRANSMISSION PROCESS WINDOW USING MULTIPLE FILL CELLS

FIELD OF THE INVENTION

The present invention relates generally to semiconductor fabrication, and more particularly, to methods and systems for active control of reticle transmission utilizing a dummy fill cell.

BACKGROUND

As the trend in semiconductors continues towards reduced critical dimensions, integrated circuits involving millions of transistors on a single chip have become commonplace. Due to the large number of devices on a single chip, an entire industry has evolved specifically to supply the semiconductor industry with software and hardware tools to automate much of the process of integrated circuit design.

Electronic design automation (EDA) tools are computer-based tools that assist through automation of procedures that would otherwise be performed manually. Simulation of proposed design functionality and synthesis of integrated circuit logic and layout are two examples.

An integrated circuit may implement logic functions that are a combination of various standard cells. A finished design may then be provided to a fabrication facility (fab) for manufacture. While the finished design may accomplish an intended purpose, there are various process windows (i.e. ranges) that must be satisfied to successfully mass-produce an integrated circuit (IC). As more complicated designs are developed to achieve higher performance and higher reliability as well as efficient chip scaling, the demand placed on process window optimization increases. It is therefore desirable to have improvements in process window optimization to address the aforementioned challenges.

SUMMARY

Embodiments of the present invention provide an improved method and system for controlling reticle transmission. With the semiconductor device dimensions scaling down aggressively, semiconductor processing is becoming more and more challenging. Effects which previously were not so important in older technologies are becoming very important in the smaller nodes such as 20 nm/14 nm. One such process challenge is maintaining a constant Reticle Transmission (RT) from the fabrication of one product to another. RT refers to a ratio of the transmission area to opaque area at the reticle level. A wide product-to-product RT variation leads to parametric or functional yield loss. In embodiments, a given process window (i.e. range) for reticle transmission is received, having an upper limit and a lower limit. For a given design, a default fill pattern is inserted in unused areas of an integrated circuit. The integrated circuit area/region is divided into logical areas called tiles. A pattern density is computed for each tile at each appropriate level, such as metallization levels, via levels, and/or contact levels. An integrated circuit RT is computed for an area corresponding to an entire integrated circuit or reticle. If the integrated circuit RT is outside of the provided process window, then the tiles that have an individual tile RT that is outside of the process window are identified and ranked into groups. For the group that is farthest outside of the process window, the default cells are replaced with replacement/new fill cells having a different pattern density. The integrated circuit RT is then recomputed to determine if it is now within the specified process window. The process iterates with the next group (i.e. the second farthest outside of the process window), and continues until the integrated circuit RT is within the process window. This results in an integrated circuit design having improved manufacturability.

In a first aspect, embodiments of the present invention provide a method for optimizing an integrated circuit for a reticle transmission (RT) process window, comprising: receiving a lower RT limit and an upper RT limit defining a RT process window; applying a default fill cell to a plurality of unused areas of an integrated circuit; generating a density table for a plurality of tiles, wherein each tile corresponds to a region of the integrated circuit, and wherein the density table contains a tile RT parameter for each tile; computing an initial integrated circuit RT parameter; determining whether the initial RT parameter is within the RT process window; identifying, in response to a condition wherein the initial RT parameter is outside of the RT process window, each tile of the plurality of tiles that has a tile RT parameter that is outside of the RT process window as an out-of-range tile; separating the out-of-range tiles into a plurality of groups, each group corresponding to a tile RT parameter range; and replacing the default fill cells in at least one group of tiles with replacement fill cells.

In a second aspect, embodiments of the present invention provide a system for designing an integrated circuit, comprising one or more processors coupled to memory containing machine instructions, that when executed by the one or more processors, perform the functions of: receiving a lower RT limit and an upper RT limit defining an RT parameter process window; applying a default fill cell to a plurality of unused areas of an integrated circuit; generating a density table for a plurality of tiles, wherein each tile corresponds to a region of the integrated circuit, and wherein the density table contains a tile RT parameter for each tile; computing an initial integrated circuit RT parameter; determining whether the initial RT parameter is within the RT process window; identifying, in response to a condition wherein the initial RT parameter is outside of the RT process window, each tile of the plurality of tiles that has a tile RT parameter that is outside of the RT process window as an out-of-range tile; separating the out-of-range tiles into a plurality of groups, each group corresponding to a particular tile RT parameter range; and replacing the default fill cells in at least one group of tiles with replacement fill cells.

In a third aspect, embodiments of the present invention provide a computer program product embodied in a computer-readable medium for designing an integrated circuit, comprising instructions, which when executed by a processor, performs the functions of: receiving a lower RT limit and an upper RT limit defining an RT parameter process window; applying a default fill cell to a plurality of unused areas of an integrated circuit; generating a density table for a plurality of tiles, wherein each tile corresponds to a region of the integrated circuit, and wherein the density table contains a tile RT parameter for each tile; computing an initial integrated circuit RT parameter; determining whether the initial RT parameter is within the RT process window; identifying, in response to a condition wherein the initial RT parameter is outside of the RT process window, each tile of the plurality of tiles that has a tile RT parameter that is outside of the RT process window as an out-of-range tile; separating the out-of-range tiles into a plurality of groups, each group corresponding to a particular tile RT parameter range; and replacing the default fill cells in at least one group of tiles with replacement fill cells.

BRIEF DESCRIPTION OF THE DRAWINGS

The accompanying drawings, which are incorporated in and constitute a part of this specification, illustrate several embodiments of the present teachings and together with the description, serve to explain the principles of the present teachings. Certain elements in some of the figures may be omitted, or illustrated not-to-scale, for illustrative clarity. The cross-sectional views may be in the form of "slices", or "near-sighted" cross-sectional views, omitting certain background lines which would otherwise be visible in a "true" cross-sectional view, for illustrative clarity. Furthermore, for clarity, some reference numbers may be omitted in certain drawings.

FIGS. 1A-1E show examples of fill cells.

FIGS. 3A-3D show examples of integrated circuits utilizing different fill cells.

DETAILED DESCRIPTION

Figure 1A:
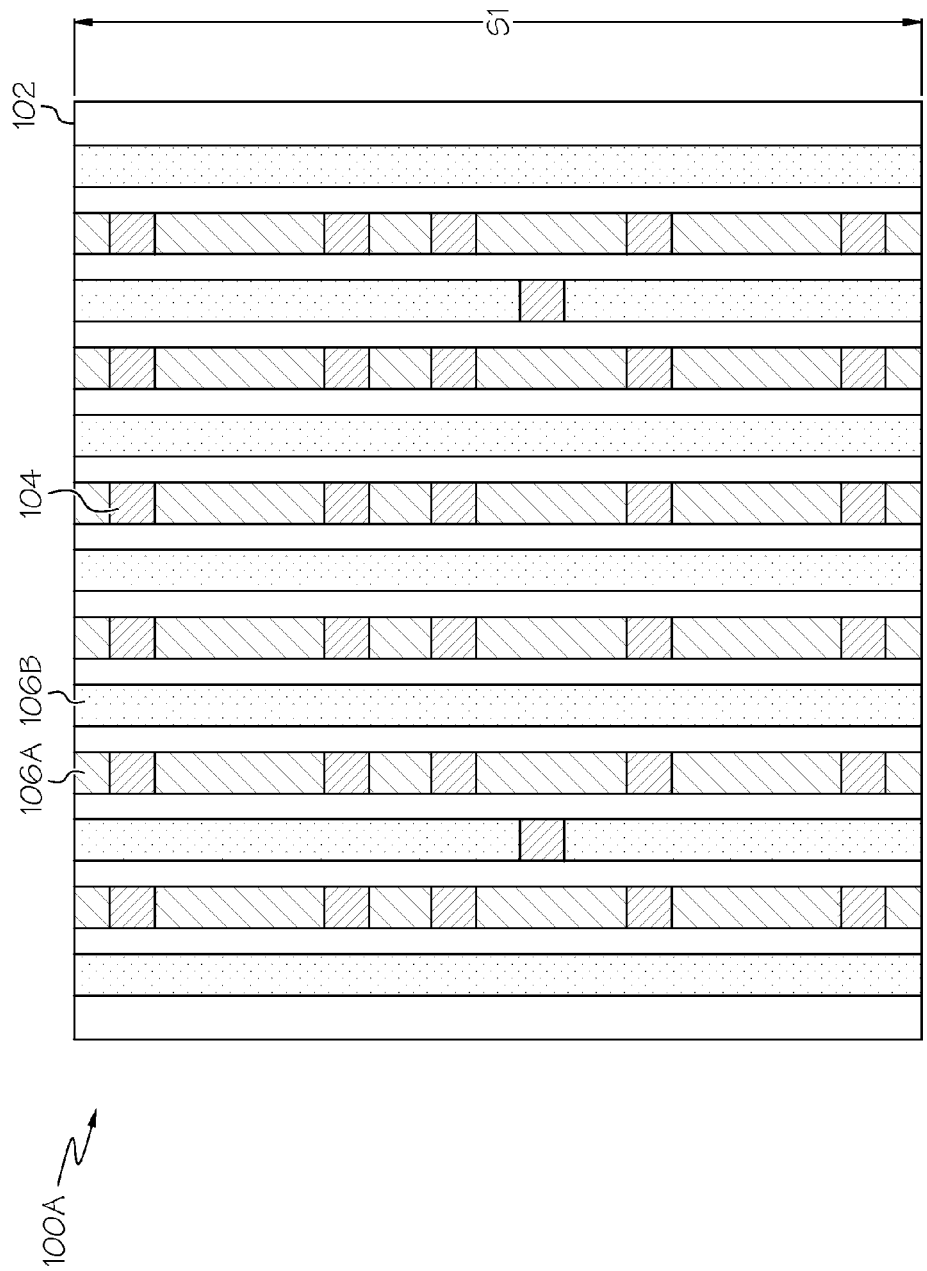

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms, "comprises" and/or "comprising" and "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Reference throughout this specification to "one embodiment," "an embodiment," "embodiments," "exemplary embodiments," "some embodiments," or similar language means that a particular feature, structure, or characteristic described in connection with the embodiment is included in at least one embodiment of the present invention. Thus, appearances of the phrases "in one embodiment," "in an embodiment," "in embodiments", "in some embodiments", and similar language throughout this specification may, but do not necessarily, all refer to the same embodiment. One or more features of an embodiment may be "mixed and matched" with features of another embodiment.

The terms "overlying" or "atop", "positioned on, "positioned atop", or "disposed on", "underlying", "beneath" or "below" mean that a first element, such as a first structure (e.g., a first layer) is present on a second element, such as a second structure (e.g. a second layer) wherein intervening elements, such as an interface structure (e.g. interface layer) may be present between the first element and the second element.

Embodiments of the present invention include systems and methods of controlling reticle transmission. A process window for reticle transmission is received. For a given design, tiles having a default fill pattern is inserted in unused areas of an integrated circuit. The integrated circuit area/region is divided into logical areas called tiles. A pattern density is computed for each tile at each appropriate level, such as metallization levels, contact levels, and via levels. An integrated circuit RT is computed for an area corresponding to an entire integrated circuit or reticle (or particular given area thereof). If the integrated circuit RT is outside of the provided process window, then the tiles that have an individual tile RT that is outside of the process window are identified and ranked into groups. For the group that is farthest outside of the process window, the default cells are replaced with replacement/new fill cells having a different pattern density (which could be more or less dense than the default pattern, depending on the circumstances). The integrated circuit RT is then recomputed to determine if it is now within the specified process window. If it is not, then the process iterates with the next group, e.g., the group which is the second furthest out of range (behind the group which was the farthest out of range), and continues until the integrated circuit RT is within the process window. This results in an integrated circuit design having improved manufacturability.

FIGS. 1A-1E show examples of fill cells. Embodiments of the inventive process can be performed on any back end of line (BEOL) layer or front end of line (FEOL) layer. The fill cells 100A-100E may each have a layer of contacts (optionally—see, for example, 100E of FIG. 1E) and a layer of metallization lines. An example contact is represented at reference number 104. Examples of the metallization lines are denoted by reference numbers 106A and 106B. In some embodiments, fill cells 100A-100E may be square and have a boundary area 102 ranging from about 400 square nanometers to about 600 square nanometers. In addition to contacts, metallization lines and/or via layers and may be used in some embodiments.

FIG. 1A shows an example default fill cell 100A. Several contacts are present, creating a default (or medium) fill density pattern.

Figure 1B:
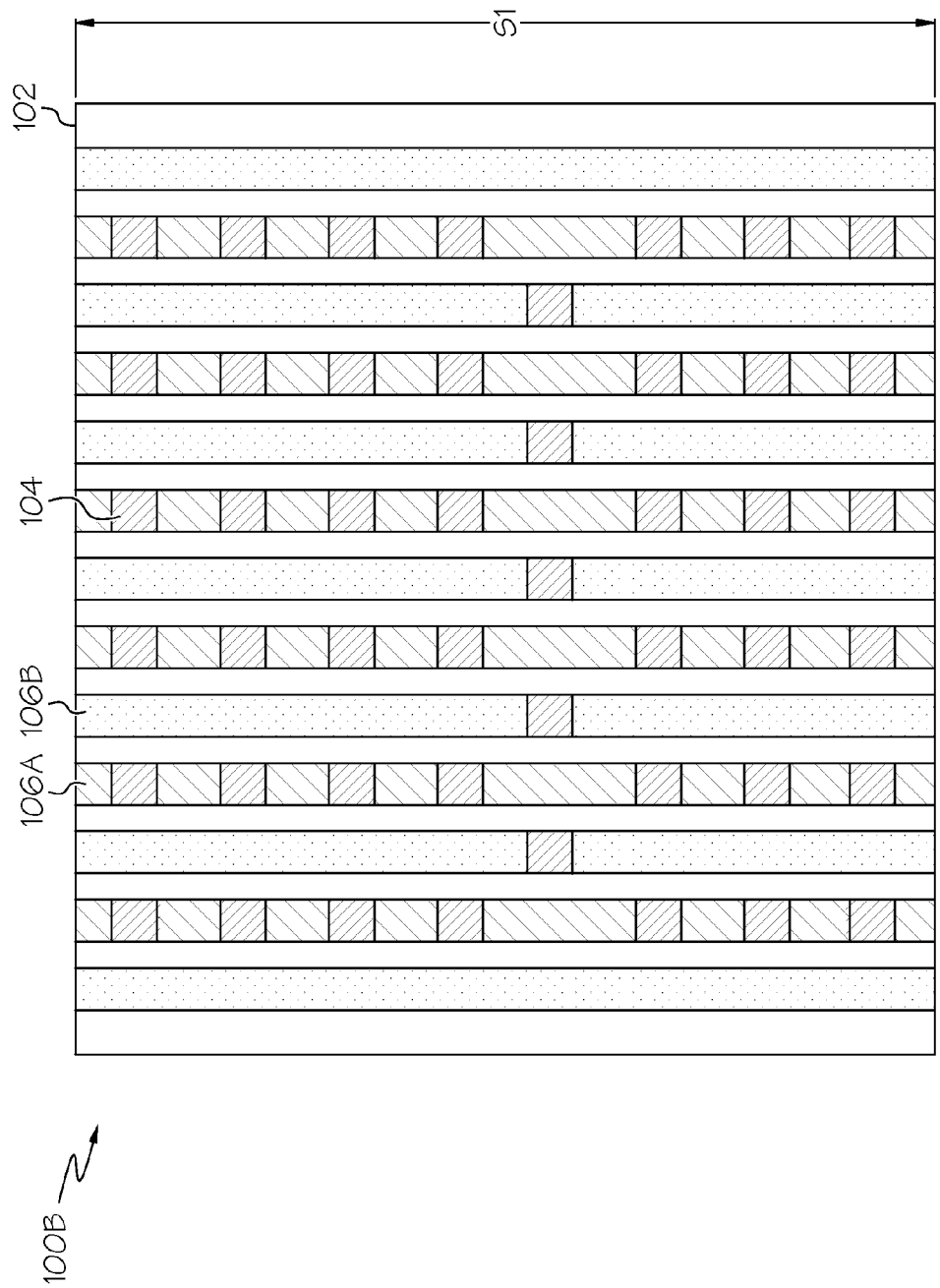

FIG. 1B shows an example maximum fill cell 100B. Fill cell 100B has a maximum fill density pattern, i.e. maximum number of contacts.

FIG. 1C shows an example heavy fill cell 100C. Fill cell 100C has a heavy fill density. The fill density pattern, i.e. the number of contacts present is increased as compared to fill cell 100A of FIG. 1.

Figure 1D:
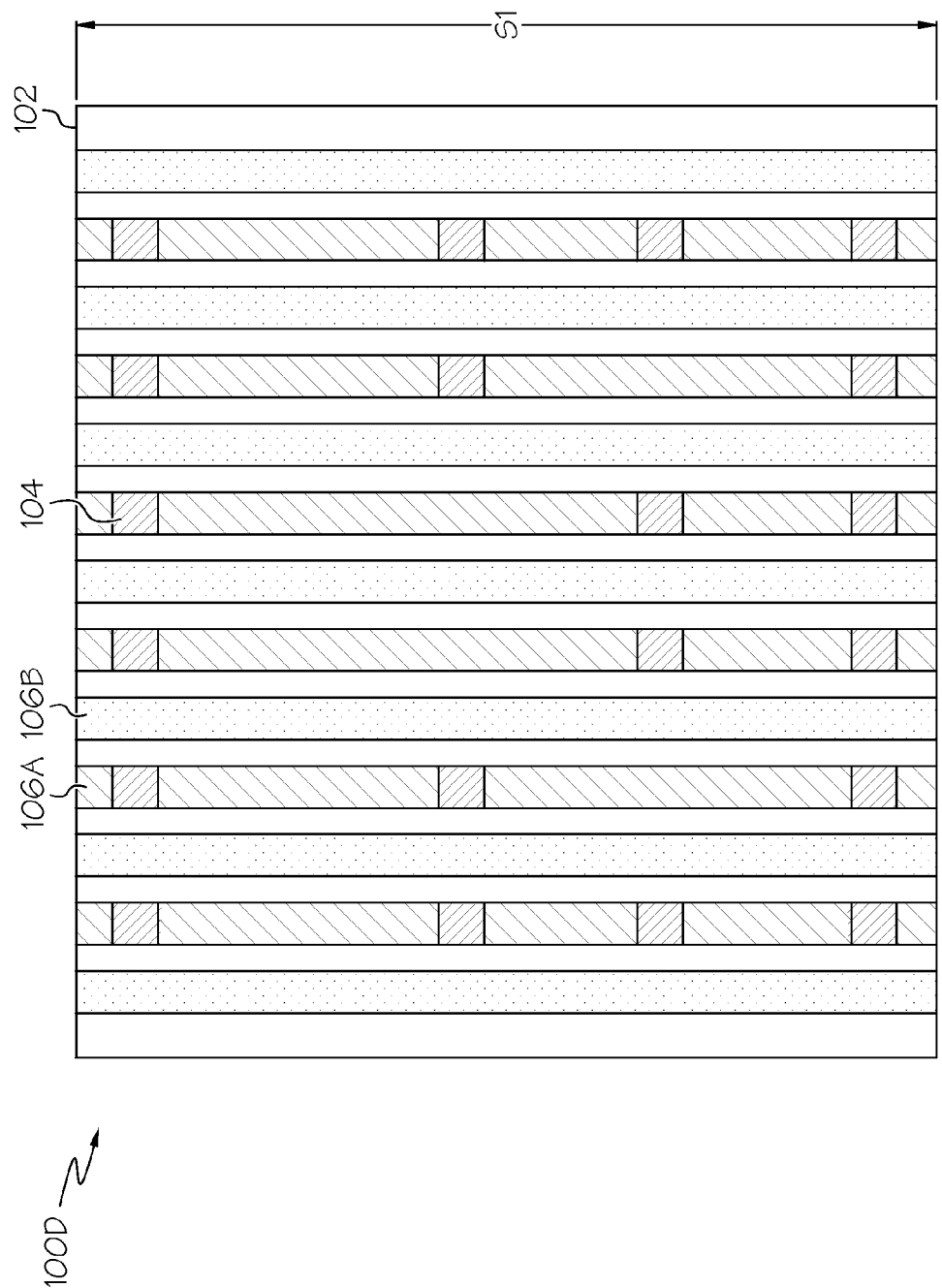

FIG. 1D shows an example of a light fill cell 100D. Fill cell 100D has a light fill density pattern, i.e. the number of contacts present is reduced in comparison to fill cell 100A of FIG. 1.

FIG. 1E shows an example of a minimum fill cell 100E. Fill cell 100E has a minimum fill density pattern. There are no contacts present.

Figure 2A:
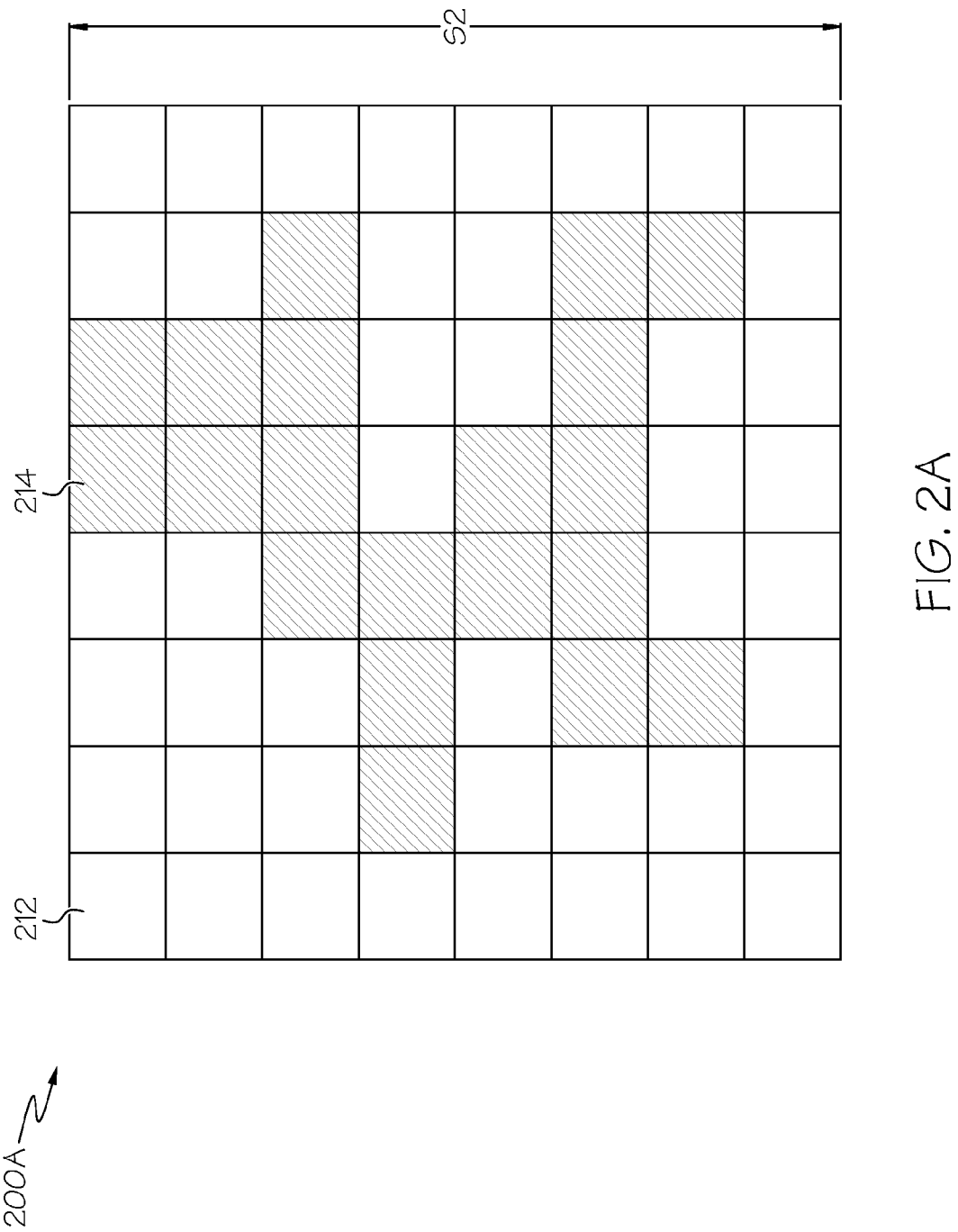
FIG. 2A and FIG. 2B show examples of tiles.
Figure 2B:
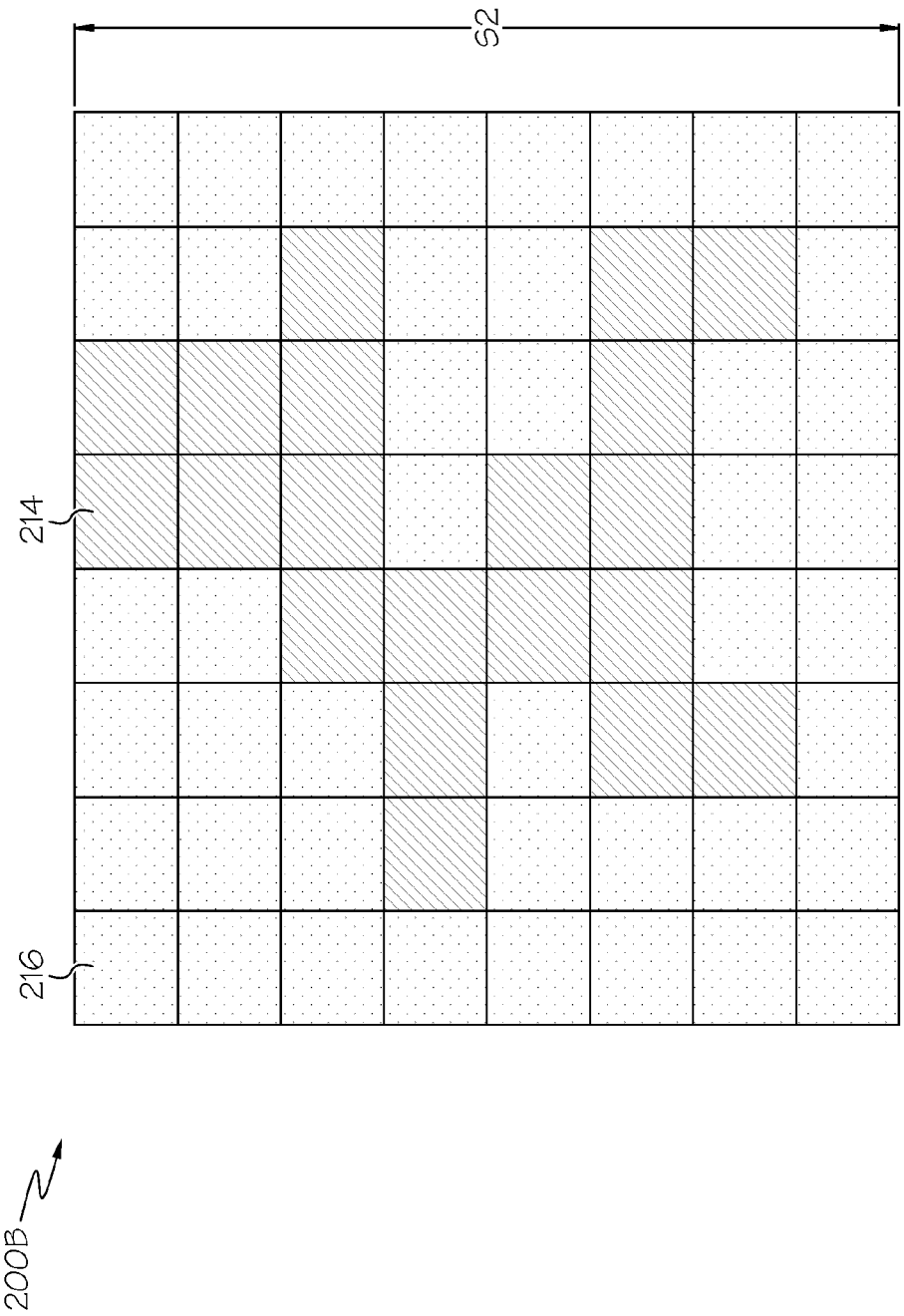

FIGS. 2A and 2B each show an example representation of a portion of an integrated circuit. This portion is a logical area referred to as a tile 200A. In some embodiments, the tile is square and has a size dimension S2 of about 300 micrometers to 1300 micrometers. On tile 200A, blocks 212 (blocks without shading) represent areas without functional circuitry. Blocks 214 (blocks with shading) have at least some functional circuitry within them.

Reticle transmission (RT) refers to the ratio of the transmission area to opaque area at the reticle level. The RT should be maintained within a process window to avoid yield issues. In embodiments, the reticle transmission (RT) process window is defined by a lower RT limit and an upper RT limit. In a circuit design where there is a large amount of unused area in the tiles, e.g., in tile 200A, the ratio will be unfavorable, causing manufacturing problems. To address this issue, fill cells, for example, 100A-100E, are used to "fill in" at least some of the unused areas on tiles of the integrated circuit. Typically, a default fill cell pattern is initially applied to a plurality of unused area of an integrated circuit with the intention to control the RT density. The fill cells are "dummy" structures, and therefore, not part of the functional circuit. FIG. 2B shows tile 200B, which represents tile 200A (FIG. 2A) after filling the empty space, i.e. blocks 212 (of FIG. 2A), with default fill cells 216, such default fill cells shown in more detail at 100A of FIG. 1A.

FIGS. 3A-3D show examples of integrated circuits utilizing tiles having different fill cell density patterns. Integrated circuits 300A-300D may each be square and have a size dimension S3. In some embodiments, S3 may be 3 to 6 millimeters.

FIG. 3A shows an example integrated circuit 300A represented by multiple tiles. Each tile (e.g., tiles shown at FIGS. 2A and 2B) is now one block of the integrated circuit 300A. Block 320A is an example of a mid-range density tile, block 320C is an example of a light density tile, block 320B is an example of a slightly denser tile than light but less than mid-range, and 320D is an example of a maximum density tile. The patterning of tile of 320A is shown at a zoom in FIG. 3A(1). This pattern density corresponds to tile 200B of FIG. 2B. It will be recognized that in practice, tiles having fill cell density patterns corresponding to other amounts may be included instead of or in addition to the four examples shown herein. In practice, more or fewer than four options may be available.

In embodiments of the invention, a density table is generated for a plurality of tiles of an integrated circuit (like 300A of FIG. 3A). The density table contains a tile RT parameter for each tile and each tile corresponds to a region of the integrated circuit. This may include computing a pattern density for each tile of a plurality of tiles. The tile RT parameter is computed based on the ratio of the transmission area to opaque area at the reticle level on the tile.

An initial integrated circuit RT parameter is computed. The integrated circuit RT parameter is computed based on the ratio of the transmission area to opaque area at the reticle level on the integrated circuit. It is then determined if the initial integrated circuit RT parameter is within the RT process window. In response to a condition where the initial integrated circuit RT parameter is outside of the integrated circuit RT process window, each tile of the plurality of tiles that has a tile RT parameter that is outside of the RT process window is identified as an "out-of-range" tile.

The out-of-range tiles are separated into a plurality of groups, each group corresponding to a tile RT parameter range, and the default fill cells in at least one group of tiles are replaced with replacement fill cells. The out-of-range tiles may be separated into multiple groups, for example, without limitation, three to six groups. The default fill cells in one or more of the groups may be replaced with fill cells of increased pattern density or decreased pattern density depending on the circumstances at hand. In some embodiments, the replacement fill cells are selected from a library of fill cells including a plurality of fill cells having a pattern density that is less than a pattern density of the default fill cell. In some embodiments, the library includes a plurality of fill cells having a pattern density that is greater than a pattern density of the default fill cell. After the replacement, an updated integrated circuit RT parameter is computed. The replacement and computation may be repeated until the updated integrated circuit RT parameter is above the lower RT limit and below the upper RT limit.

Figure 3B:
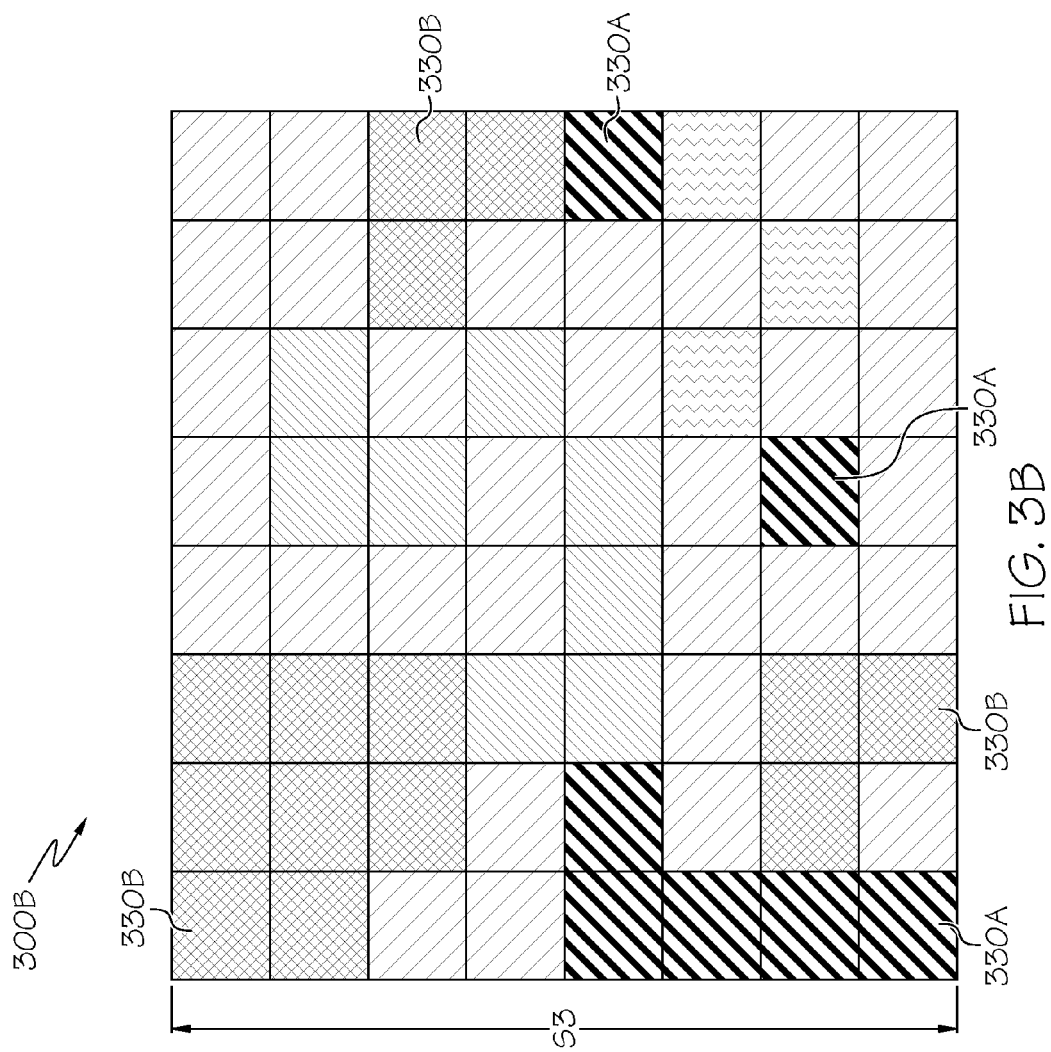

Returning to the example at hand, integrated circuit 300A was determined to have an integrated circuit RT parameter outside of the process window. FIG. 3B shows integrated circuit 300B, which is a representation of integrated circuit 300A where a set of tiles which were determined to be out-of-range are shown divided into two groups. The tile RT parameters for tiles 320B and 320C were determined to be out-of-range having insufficient fill pattern density. In other words, the amount of functional circuit present on the tiles as compared to the amount of default fill cells/pattern was of an unfavorable ratio. The out-of-range tiles were divided into two groups 330A and 330B. 330A is the "farthest out of range" group of tiles, and 330B is the "next (or second) farthest out of range" group of tiles.

FIG. 3C shows an integrated circuit 300C, which is a representation of integrated circuit 300B after the fill pattern on the first group of tiles 330A is replaced with the maximum fill pattern (density) as shown by tiles 330C. The integrated circuit RT is then recomputed. In this example, the integrated circuit RT parameter is still outside of the process window.

Figure 3D:
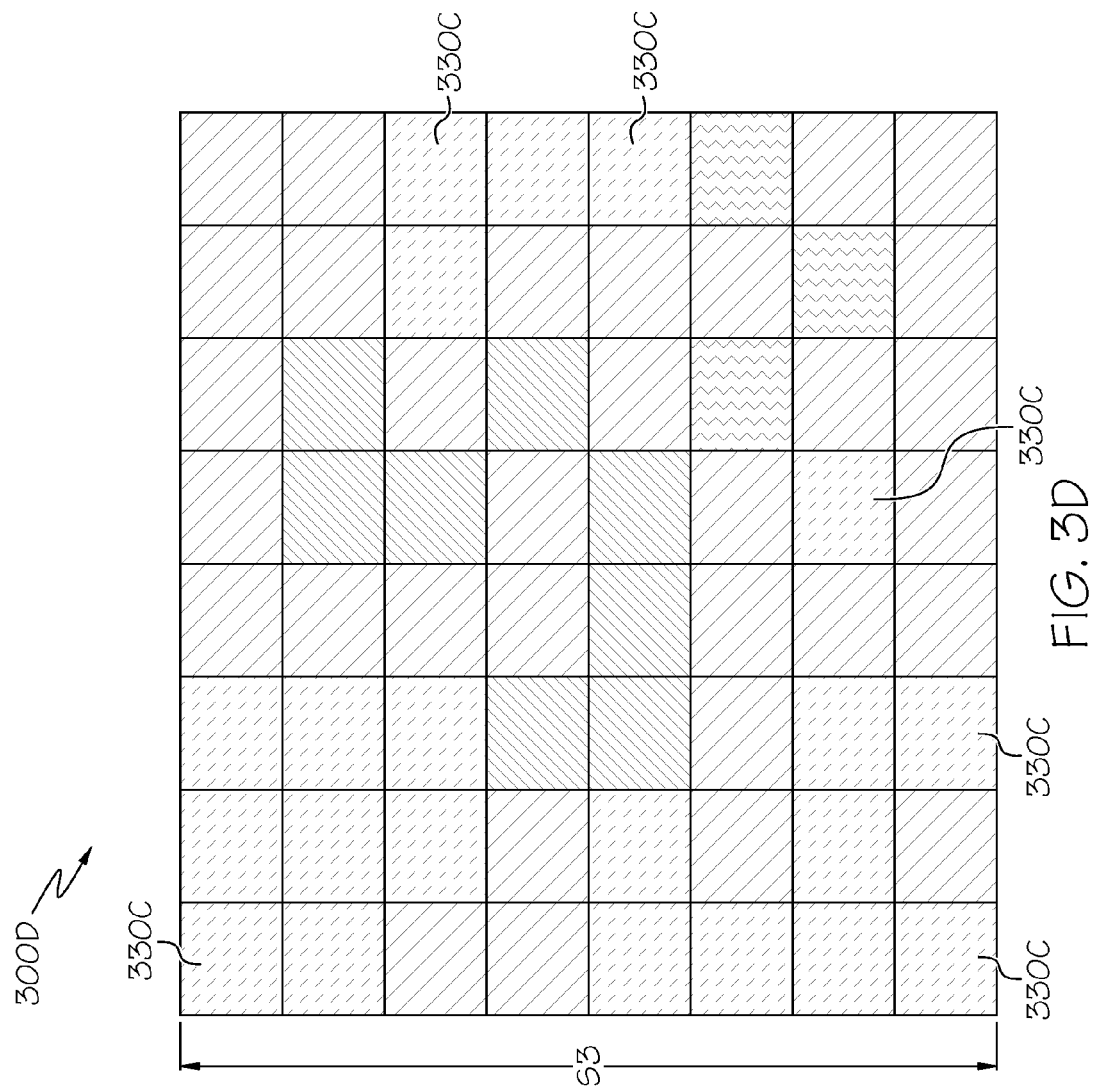

FIG. 3D shows integrated circuit 300D, which is a representation of integrated circuit 300C of FIG. 3C after the second group of out of range tiles 330B has had its fill pattern replaced with the maximum fill pattern. So, all of the previously out of range tiles now are shown as 330C having the maximum fill density pattern.

In practice, replacing the default fill cells in one group of tiles with replacement fill cells, computing an updated integrated circuit RT parameter may be repeated until the updated integrated circuit RT parameter is within the process window, i.e. above the received lower RT limit and below the received upper RT limit.

Figure 4:
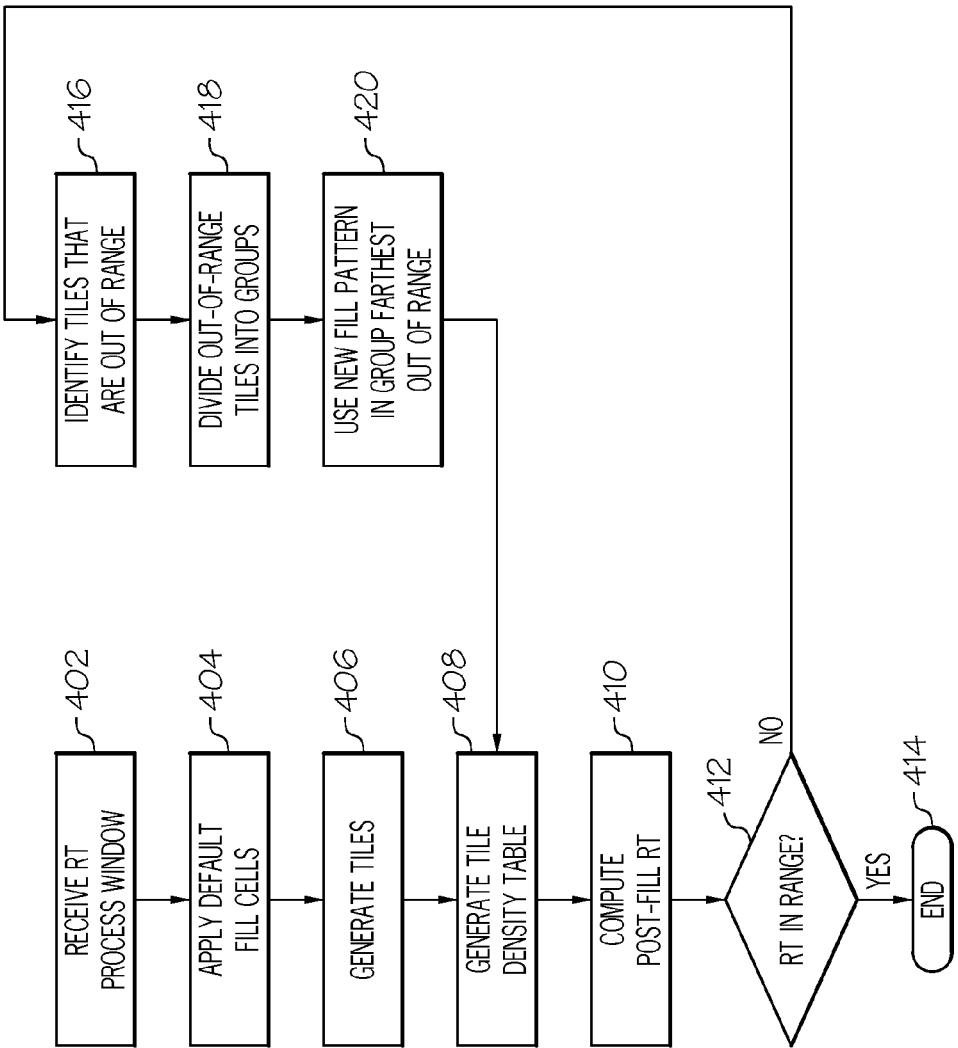
FIG. 4 is a flowchart indicating process steps for embodiments of the present invention.

FIG. 4 is a flowchart indicating process steps for embodiments of the present invention. At 402, a lower RT limit and an upper RT limit are received defining a RT process window. At 404, a default fill cell is applied to a plurality of unused areas of an integrated circuit. At 406, tiles are generated. At 408, a density table for a plurality of tiles is generated, wherein each tile corresponds to a region of the integrated circuit, and wherein the density table contains a tile RT parameter for each tile. At 410, an initial integrated circuit RT parameter is computed. At 412, it is determined whether the RT parameter is within the RT process window. If yes, then the process ends at 414. If not, then at 416, each tile of the plurality of tiles that has a tile RT parameter that is outside of the RT process window is identified as an out-of-range tile. At 418, the out-of-range tiles are separated into a plurality of groups, each group corresponding to a tile RT parameter range. At 420, the default fill cells in at least one group of tiles are replaced with replacement fill cells, i.e. a replacement fill pattern (i.e. default fill cells are replaced with fill cells of higher or lower densities on the tiles) is used in the group which is furthest out of range. The process then continues back to 410, where the post-fill reticle transmission is computed. At 412, it is determined whether the reticle transmission is now within the range. The process continues until an in-range integrated circuit reticle transmission is achieved.

Figure 5:
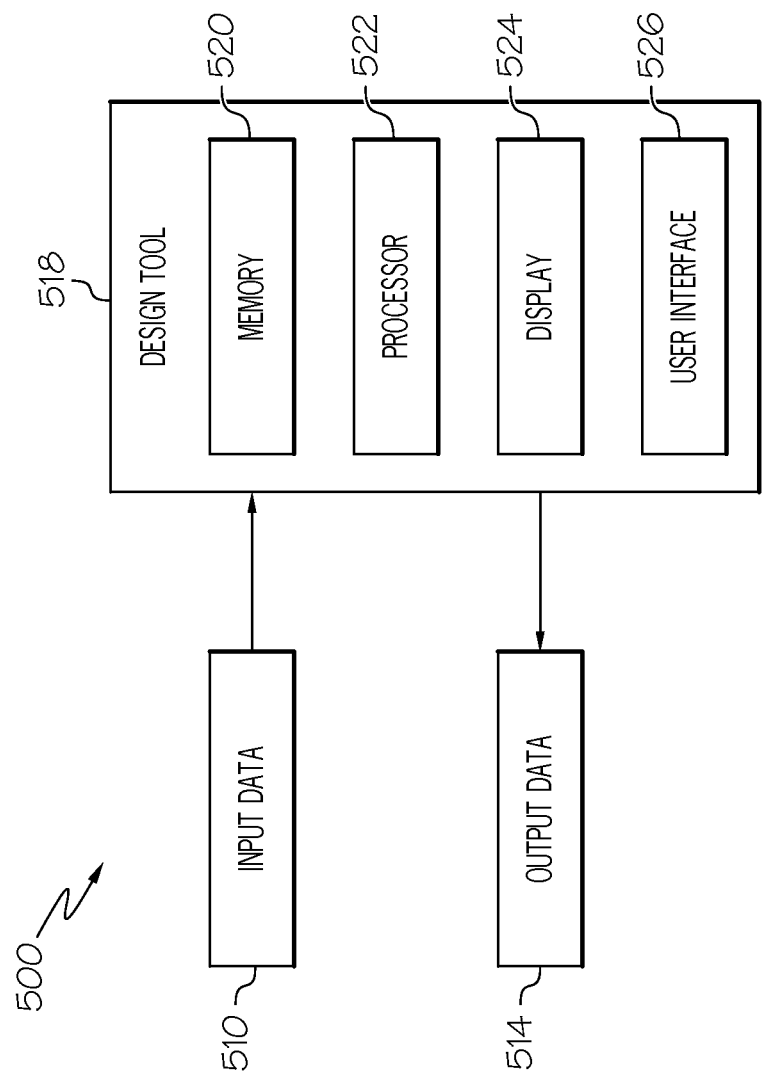
FIG. 5 is diagram of an example system for implementing illustrative embodiments.

FIG. 5 is a system 500 for implementing illustrative embodiments. System 500 includes a design tool 518. Design tool 518 may be a computer comprising memory 520, and a processor 522 which is coupled to memory 520, such that the processor 522 may be configured to read and write memory 520. In some embodiments, multiple processors or cores may be used. The memory 520 may be a computer-readable medium, such as flash, ROM, non-volatile static ram, or other memory. In some embodiments, the memory 520 may be non-transitory. The memory 520 contains instructions that, when executed by processor 522, control the various subsystems to operate system 500. Design tool 518 may also include a display 524 and a user interface 526 for interacting with the system 500. The user interface 526 may include a keyboard, touch screen, mouse, or the like.

The design tool 518 may receive input data 510. Input data 510 may include a design structure, which may be a structure comprising a plurality of fill cells, wherein the plurality of equalizer cells have varying pattern densities, in order to satisfy an integrated circuit RT process window. Input data 510 may further include a library of fill cells, wherein the fill cells have a range of pattern densities. The design structure may be a logical simulation design structure generated and processed by a design process to produce a logically equivalent functional representation of a hardware device. The design structure may also or alternatively include data and/or program instructions that when processed by design tool 518, generate a functional representation of the physical structure of a hardware device. The input data 510 may include hardware-description language (HDL) design entities or other data structures conforming to and/or compatible with lower-level HDL design languages such as Verilog and VHDL, and/or higher level design languages such as C, C++, or Python. Embodiments of the present invention may further include a computer program product embodied in a non-transitory computer-readable medium.

The design tool 518 may generate output data 514. The generated output data 514 may be in a stream format indicative of a structure comprising a plurality of fill cells, wherein the plurality of fill cells have varying pattern densities, in order to satisfy an integrated circuit RT process window. The output data may reside in a storage medium in a data format used for the exchange of layout data of integrated circuits (e.g. information stored in a GDSII (GDS2), GL1, OASIS, or any other suitable format for storing such design structures). Output data 614 may include information such as, for example, parameterized cells, test data files, design content files, manufacturing data, layout parameters, wires, middle of line (MOL) interconnect information, net lists, levels of metal, vias, contacts, shapes, data for routing through the manufacturing line, and any other data required by a semiconductor manufacturer to produce embodiments of the present invention.

In various embodiments, design tools can be provided and configured to create the datasets used to pattern the semiconductor layers as described herein. For example, data sets can be created to generate photomasks used during lithography operations to pattern the layers for structures as described herein. Such design tools can include a collection of one or more modules and can also include hardware, software, or a combination thereof. Thus, for example, a tool can be a collection of one or more software modules, hardware modules, software/hardware modules, or any combination or permutation thereof. As another example, a tool can be a computing device or other appliance on which software runs or in which hardware is implemented. As used herein, a module might be implemented utilizing any form of hardware, software, or a combination thereof. For example, one or more processors, controllers, application-specific integrated circuits (ASIC), programmable logic arrays (PLAs), logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

In some embodiments, the invention provides a computer-readable medium that includes for designing an integrated circuit, instructions, which when executed by a processor (e.g. 522 of FIG. 5), performs the functionality disclosed herein. To this extent, the computer-readable medium includes instructions that implements each of the various processes of the invention. In some embodiments, the term computer-readable medium may comprise one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 520 (FIG. 5) and/or a storage system (e.g., a fixed disk, a read-only memory, a random access memory, a cache memory, etc.).

While the invention has been particularly shown and described in conjunction with exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with the present invention. Furthermore, the methods according to the present invention may be implemented in association with the formation and/or processing of structures illustrated and described herein as well as in association with other structures not illustrated. Therefore, it is to be understood that the appended claims are intended to cover all such modifications and changes that fall within the true spirit of the invention.

What is claimed is:

1. A method for optimizing an integrated circuit for a reticle transmission (RT) process window, comprising:
receiving a lower RT limit and an upper RT limit defining the RT process window;
applying default fill cells having a default cell pattern to a plurality of unused areas of the integrated circuit;

generating a density table for a plurality of tiles, wherein each tile corresponds to a region of the integrated circuit, and the density table contains a tile RT parameter for said each tile;
computing an initial integrated circuit RT parameter;
determining whether the initial integrated circuit RT parameter is within the RT process window;
identifying, in response to a condition wherein the initial integrated circuit RT parameter is outside of the RT process window, each tile of the plurality of tiles that has a tile RT parameter that is outside of the RT process window as an out-of-range tile;
separating the out-of-range tiles into a plurality of groups, wherein each group corresponds to a tile RT parameter range; and
replacing the default fill cells in at least one group of tiles with replacement fill cells having an appropriate pattern and pattern density.

2. The method of claim 1, wherein the generating a density table for a plurality of tiles comprises computing a pattern density for each tile of the plurality of tiles, wherein each tile of the plurality of tiles has a square shape.

3. The method of claim 1, wherein the separating the out-of-range tiles into a plurality of groups, each group corresponding to a tile RT parameter range comprises separating the out-of-range tiles into three to six groups.

4. The method of claim 1, wherein the replacing the default fill cells in at least one group of tiles with replacement fill cells comprises replacing the default fill cells in each group with fill cells of increased pattern density.

5. The method of claim 1, wherein the replacing the default fill cells in at least one group of tiles with replacement fill cells comprises replacing the default fill cells in each group with fill cells of decreased pattern density.

6. The method of claim 1, further comprising repeating steps of:
replacing the default fill cells in one group of tiles with the replacement fill cells; and
computing an updated integrated circuit RT parameter;
until the updated integrated circuit RT parameter is above the lower RT limit and the updated integrated circuit RT parameter is below the upper RT limit.

7. The method of claim 6, wherein the replacing the default fill cells in one group of tiles with replacement fill cells comprises selecting the replacement fill cells from a library of fill cells comprising a plurality of fill cells having a pattern density that is less than a pattern density of the default fill cells.

8. The method of claim 6, wherein the replacing the default fill cells in one group of tiles with replacement fill cells comprises selecting the replacement fill cells from a library of fill cells comprising a plurality of fill cells having a pattern density that is greater than a pattern density of the default fill cells.

9. A system for designing an integrated circuit, comprising one or more processors coupled to a memory containing machine executable instructions that, when executed by the one or more processors, perform functions of:
receiving a lower reticle transmission (RT) limit and an upper RT limit defining an RT process window;
applying default fill cells having a default cell pattern to a plurality of unused areas of the integrated circuit;
generating a density table for a plurality of tiles, wherein each tile corresponds to a region of the integrated circuit, and the density table contains a tile RT parameter for said each tile;
computing an initial integrated circuit RT parameter;
determining whether the initial integrated circuit RT parameter is within the RT process window;
identifying, in response to a condition wherein the initial integrated circuit RT parameter is outside of the RT process window, each tile of the plurality of tiles that has a tile RT parameter that is outside of the RT process window as an out-of-range tile;
separating the out-of-range tiles into a plurality of groups, wherein each group corresponds to a particular tile RT parameter range; and
replacing the default fill cells in at least one group of tiles with replacement fill cells having an appropriate pattern and pattern density.

10. The system of claim 9, wherein the memory further comprises instructions that, when executed by the one or more processors, perform functions of computing a pattern density for each tile of the plurality of tiles, wherein each tile of the plurality of tiles has a square shape.

11. The system of claim 9, wherein the memory further comprises instructions that, when executed by the one or more processors, perform functions of replacing the default fill cells in each group with fill cells of increased pattern density.

12. The system of claim 9, wherein the memory further comprises instructions that, when executed by the one or more processors, perform functions of replacing the default fill cells in each group with fill cells of decreased pattern density.

13. The system of claim 9, wherein the memory further comprises instructions that, when executed by the one or more processors, perform functions of
repeating steps of:
replacing the default fill cells in one group of tiles with the replacement fill cells; and
computing an updated integrated circuit RT parameter;
until the updated integrated circuit RT parameter is above the lower RT limit and the updated integrated circuit RT parameter is below the upper RT limit.

14. The system of claim 9, further comprising a non-transitory computer readable medium containing a library of fill cells, wherein each fill cell in the library has a different pattern density.

15. A computer program product embodied in a non-transitory computer-readable medium for designing an integrated circuit, comprising instructions which, when executed by a processor, perform functions of:
receiving a lower reticle transmission (RT) limit and an upper RT limit defining an RT process window;
applying default fill cells having a default cell pattern to a plurality of unused areas of the integrated circuit;
generating a density table for a plurality of tiles, wherein each tile corresponds to a region of the integrated circuit, and the density table contains a tile RT parameter for said each tile;
computing an initial integrated circuit RT parameter;
determining whether the initial integrated circuit RT parameter is within the RT process window; and
identifying, in response to a condition wherein the initial integrated circuit RT parameter is outside of the RT process window, each tile of the plurality of tiles that has a tile RT parameter that is outside of the RT process window as an out-of-range tile;
separating the out-of-range tiles into a plurality of groups, wherein each group corresponds to a particular tile RT parameter range; and replacing the default fill cells in at least one group of tiles with replacement fill cells having an appropriate pattern and pattern density.

16. The computer program product of claim 15, further comprising instructions for computing a pattern density for each tile of the plurality of tiles, wherein each tile of the plurality of tiles has a square shape.

17. The computer program product of claim 15, further comprising instructions for separating the out-of-range tiles into a plurality of groups comprising three to six groups.

18. The computer program product of claim 15, further comprising instructions selecting the replacement fill cells from a library comprising a plurality of fill cells having a pattern density that is less than a pattern density of the default fill cells.

19. The computer program product of claim 15, further comprising instructions selecting the replacement fill cells from a library comprising a plurality of fill cells having a pattern density that is greater than a pattern density of the default fill cells.

20. The computer program product of claim 15, further comprising instructions for
repeating steps of:
replacing the default fill cells in one group of tiles with the replacement fill cells; and
computing an updated integrated circuit RT parameter;
until the updated integrated circuit RT parameter is above the lower RT limit and the updated integrated circuit RT parameter is below the upper RT limit.

\* \* \* \* \*